US010551991B2

(12) United States Patent
Yao et al.

(10) Patent No.: US 10,551,991 B2
(45) Date of Patent: Feb. 4, 2020

(54) DISPLAY METHOD AND TERMINAL

(71) Applicant: Lenovo (Beijing) Co., Ltd., Beijing (CN)

(72) Inventors: Cen Yao, Beijing (CN); Xi Wan, Beijing (CN); Qicheng Ding, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/941,491

(22) Filed: Mar. 30, 2018

(65) Prior Publication Data

US 2018/0284950 A1     Oct. 4, 2018

(30) Foreign Application Priority Data

Mar. 30, 2017 (CN) .......................... 2017 1 0203486

(51) Int. Cl.
*G06F 3/048*     (2013.01)
*G06F 3/0481*    (2013.01)
*G06F 3/01*      (2006.01)
*G06F 3/0484*    (2013.01)
*G02B 27/01*     (2006.01)

(52) U.S. Cl.
CPC ....... *G06F 3/0481* (2013.01); *G02B 27/0172* (2013.01); *G06F 3/011* (2013.01); *G06F 3/04845* (2013.01); *G02B 2027/014* (2013.01); *G02B 2027/0123* (2013.01); *G02B 2027/0141* (2013.01); *G02B 2027/0178* (2013.01)

(58) Field of Classification Search
CPC ......... G06F 3/0481; G06F 3/01; G06F 3/0484
See application file for complete search history.

(56) References Cited

U.S. PATENT DOCUMENTS

| 8,373,725 B2* | 2/2013 | Ryu | ...................... G06T 19/006 345/633 |
| 8,947,457 B2* | 2/2015 | Ryu | ...................... G06T 19/006 345/633 |
| 2014/0168267 A1* | 6/2014 | Kim | ....................... G06F 3/017 345/633 |
| 2014/0306993 A1* | 10/2014 | Poulos | .................. G06T 19/006 345/633 |
| 2017/0161958 A1* | 6/2017 | Eilat | ..................... G02B 27/017 |
| 2018/0137714 A1* | 5/2018 | Schmidt | ................. G06F 3/017 |
| 2018/0181844 A1* | 6/2018 | Barnett | .................. H04W 4/02 |
| 2018/0284950 A1* | 10/2018 | Yao | ....................... G06F 3/0481 |
| 2018/0322702 A1* | 11/2018 | Djajadiningrat | ..... A61N 1/3993 |

FOREIGN PATENT DOCUMENTS

CN      106131647 A     11/2016

* cited by examiner

*Primary Examiner* — David E Choi
(74) *Attorney, Agent, or Firm* — Anova Law Group, PLLC

(57) ABSTRACT

A display method and a terminal are provided. The display method comprises: receiving a first operation instruction by a terminal from a user positioned at a first orientation with respect to a first display area of the terminal; and responsive to receiving the first operation instruction, displaying, by the terminal, a guiding interface at least including identification information of a first display interface disposed at least partially outside the first display area of the terminal.

16 Claims, 6 Drawing Sheets

DISPLAY METHOD AND TERMINAL

CROSS-REFERENCES TO RELATED APPLICATIONS

This application claims the priority of Chinese patent application No. CN201710203486.2, filed on Mar. 30, 2017, the entire content of which is incorporated herein by reference.

FIELD OF THE DISCLOSURE

The present disclosure relates to the field of electronic technology and, more particularly, relates to a display method and a terminal.

BACKGROUND

Augmented reality (AR) glasses enable display areas to be extended in space. When a user wears a pair of AR glasses, a display effect shown in FIG. 1 is obtained. As shown in FIG. 1, a plurality of virtual display areas are extended around a display screen of the computer, and interfaces of a plurality of applications running on the computer are displayed on the display screen of the computer and the plurality of virtual display areas, respectively. The interfaces of the applications running on the computer are hereinafter referred as display interfaces.

When multiple display interfaces are simultaneously displayed, due to the limitation of field of view (FOV), some display interfaces may be located outside the display area confined by the current FOV. The display area confined by the current FOV are hereinafter referred as current display area. That is, some display interfaces may be located outside the current display area. As a result, the user cannot see the content of all the display interfaces.

Thus, when multiple display interfaces are simultaneously displayed based on the AR glasses, how to quickly navigate to the display interfaces located outside the current display area is highly desired to be solved. The disclosed display method and terminal are directed to solve one or more problems set forth above and other problems.

BRIEF SUMMARY OF THE DISCLOSURE

One aspect of the present disclosure provides a display method. The display method comprises: receiving a first operation instruction by a terminal from a user positioned at a first orientation with respect to a first display area of the terminal; and responsive to receiving the first operation instruction, displaying, by the terminal, a guiding interface at least including identification information of a first display interface disposed at least partially outside the first display area of the terminal.

Another aspect of the present disclosure provides a terminal. The terminal comprises: a processor; a display device coupled to the processor; and an input device wherein the input device is coupled to the processor and receives a first operation instruction from a user positioned at a first orientation with respect to a first display area of the display device. Responsive to the input device receiving the first operation instruction, the processor controls the display device to display a guiding interface including identification information of a first display interface disposed at least partially outside the first display area of the display device.

Other aspects of the present disclosure may be understood by those skilled in the art in light of the description, the claims, and the drawings of the present disclosure.

BRIEF DESCRIPTION OF THE DRAWINGS

To more clearly illustrate technical solutions of embodiments or in the prior art, accompany drawings which need to be used in the description of the embodiments or the prior art will be simply introduced. Obviously, the accompany drawings in the following description are merely some embodiments, and for those of ordinary skill in the art, other embodiments can further be obtained according to these accompany drawings without contributing any creative work.

DETAILED DESCRIPTION

Reference will now be made in detail to examples of embodiments of the disclosure, which are illustrated in the accompanying drawings. Wherever possible, the same reference numbers will be used throughout the drawings to refer to the same or like parts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Figure 1:
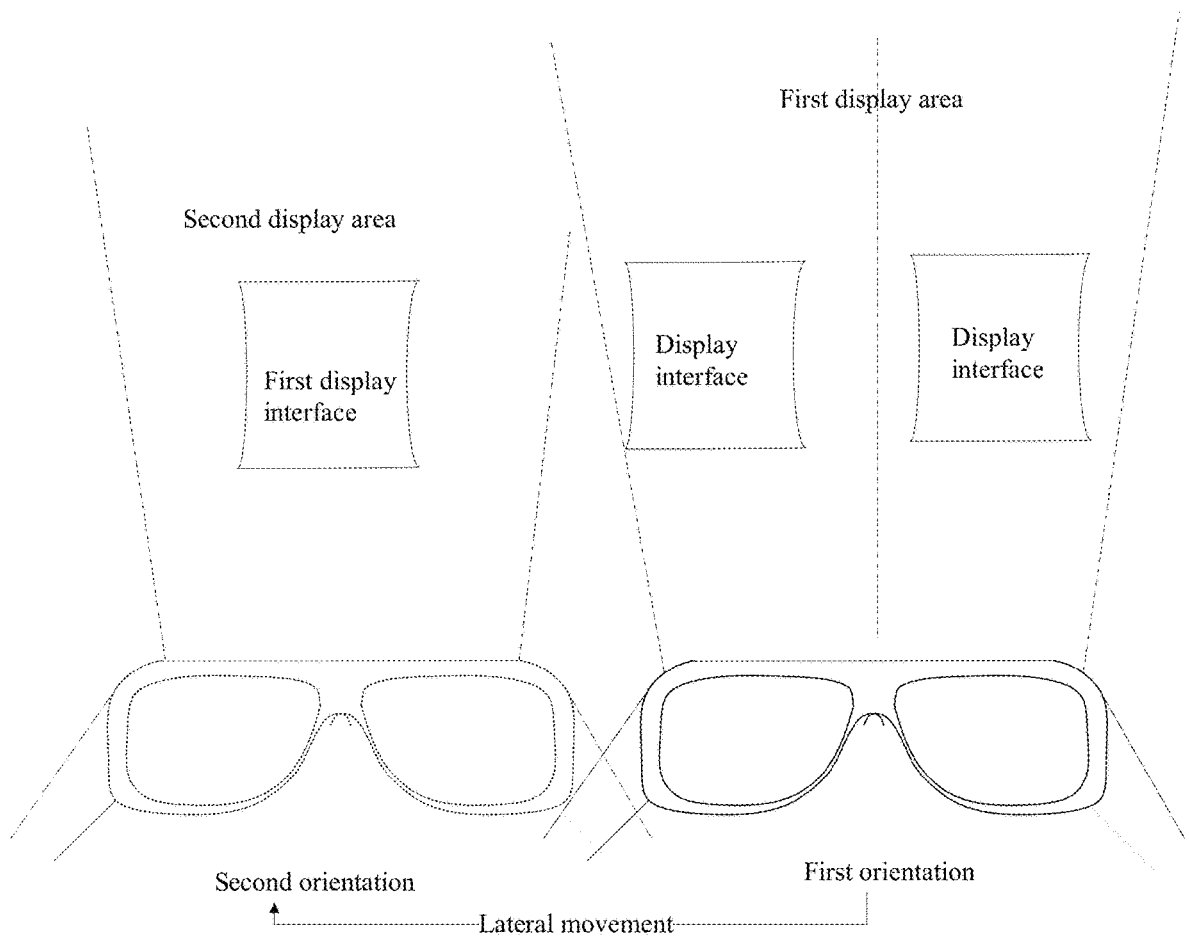
FIG. 1 illustrates a schematic diagram of an existing relative position relationship of a terminal, a display area, and a display interface.

FIG. 1 illustrates a schematic diagram of an existing relative position relationship of a terminal, a display area, and a display interface. As shown in FIG. 1, a user wears a terminal, and the terminal includes a lens group for projecting the content of a virtual image to the user's eyes to present the display content. In particular, the user's FOV is a first display area when the terminal (user) is positioned at a first orientation, and the user's FOV is a second display area when the terminal (user) is positioned at a second orientation. That is, the first orientation corresponds to or is with respect to the first display area, and the second orientation corresponds to or is with respect to the second display area.

As discussed above, the display interface of the terminal refers to the interface of an application which is currently running. The application may run in the terminal, or run in other electronic devices while the display interface is display by the terminal.

The display position of the first display interface is located inside the second display area but at least partially outside the first display area. That is, when the user wearing the terminal is positioned at the first orientation, the user is unable to see the first display interface. To see the first display interface, the user wearing the terminal has to laterally move a certain distance to the second orientation away from the first orientation as shown in FIG. 1, or the user wearing the terminal may also rotate by a certain angle to the second orientation away from the first orientation.

That is, as shown in FIG. 1, to see the display interfaces located outside the current display area, the orientation of the terminal (or the orientation of the user wearing the terminal) may have to be adjusted, which may significantly degrade the user experience.

To solve one or more problems set forth above and other problems, the present disclosure provides an improved display method and terminal, which is capable of quickly navigating the user to the display interfaces located outside the current display area. In particular, when the user wearing the terminal (e.g., on the user's head) is positioned at the first orientation, i.e., the first display interface is not in the current display area, the user may be able to quickly navigate to the first display interface without adjusting the orientation of the terminal (i.e., the orientation of the user wearing the terminal). The terminal described in the disclosed embodiments may include but not limit to the augmented reality (AR) or virtual reality (VR) glasses shown in FIG. 1.

Figure 2:
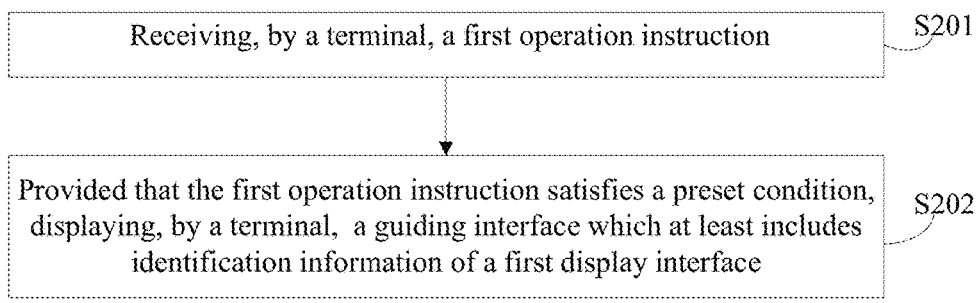
FIG. 2 illustrates a flow chart of an exemplary display method consistent with disclosed embodiments.

FIG. 2 illustrates a flow chart of an exemplary display method consistent with disclosed embodiments. The disclosed display method may be implemented into the terminal shown in FIG. 1. As shown in FIG. 2, the display method may comprise the following steps.

At the beginning, the terminal receives a first operation instruction (S201).

In particular, the terminal may receive the first operation instruction from a user positioned at a first orientation with respect to a first display area of the terminal. The first operation instruction may be an instruction which may be triggered by the user's gesture, voice, or operation on the terminal. That is, the terminal may have a function of recognizing gesture and/or voice, and in response to detecting the user's gesture and/or voice, the terminal may convert the detected gesture and/or voice into a corresponding instruction. The method of recognizing gesture and/or voice may be referred to prior arts, which are not repeated here.

In one embodiment, the terminal may be AR glasses, and the first operation instruction may be an instruction corresponding to a click gesture detected within the recognition range of the AR glasses.

In response to receiving the first operation instruction, provided that the first operation instruction satisfies a preset condition, the terminal displays a guiding interface, and the guiding interface includes identification information of a first display interface located outside a current display area (S202).

In particular, the preset condition may be set in advance. The preset condition may include, for example, a time condition, a spatial condition, or a user operation type condition. For example, the preset condition may be the first operation instruction is hold for 3 seconds, or a gesture is detected in a pre-defined space, or a first type of gesture is detected.

The guiding interface may include the identification information of the first display interface. The guiding interface may be displayed in a form of existing technologies. For example, the guiding interface may be displayed in the form of a toolbar or a taskbar.

Figure 3:
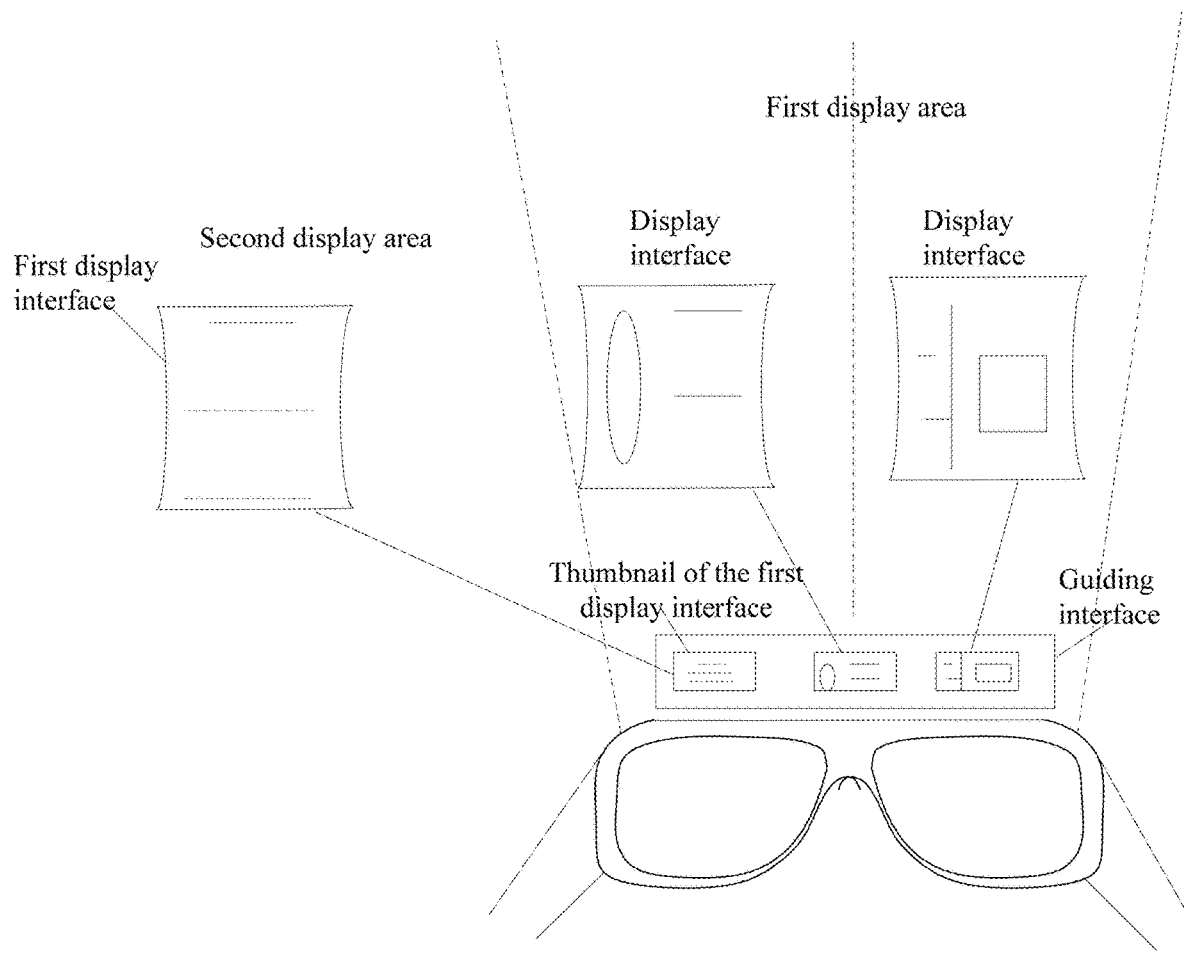
FIG. 3 illustrates an exemplary guiding interface consistent with disclosed embodiments.

FIG. 3 illustrates an exemplary guiding interface consistent with disclosed embodiments. As shown in FIG. 3, the guiding interface may be displayed in the form of a toolbar, and the identification information may be a thumbnail. The guiding interface may include thumbnails of multiple display interfaces.

In one embodiment, the thumbnail may be generated according to the content of the corresponding display interface. For example, the thumbnail may include the first line of text, or title, or keywords (not drawn in FIG. 3) of the corresponding display interface.

In another embodiment, the thumbnail may be generated according to the layout of the corresponding display interface. That is, the user may be able to recognize the layout of the text and picture (drawn in FIG. 3) of the corresponding display interface clearly shown in thumbnail, but unable to discern the specific contents of the text and the picture.

In another embodiment, the thumbnails of some display interfaces may be generated according to the content of the corresponding display interfaces, while the thumbnails of some other display interfaces may be generated according to the layout of the corresponding display interfaces.

In summary, the thumbnail may guide the user to have an overview of the display interface, rather than to discern the specific content of the display interface.

The guiding interface shown in FIG. 3 may include the thumbnails of all the display interfaces or some display interfaces, but have to include thumbnails of the display interface that is not displayed in the current display area (i.e., disposed outside the current display area). For example, when the first display interface is not displayed in the current first display area, the guiding interface may have to include at least the thumbnail of the first display interface. That is, even the user does not see the first display interface in the first display area which is the current display area, the user may still be able to have an overview of the first display interface through the corresponding thumbnail. Thus, even the first display interface is not displayed in the current first display area, the user may still be able to quickly navigate to the first display interface without adjusting the orientation of the terminal.

The guiding interface may be displayed anywhere in the current display area of the terminal. The display position of the guiding interface in the current display area may be determined by the user in advance or as default by the terminal.

The identification information may distinguish different display interfaces. It should be noted that, in FIG. 3, the identification information is the thumbnail, which is for illustrative purposes and is not intended to limit the scope of the present disclosure. In practical applications, the identification information may be specifically configured for different application scenarios. For example, the identification information may be the name of the application which provides the display interface, such as WeChat, or Word.

As shown in FIG. 2 and FIG. 3, in the disclosed display method, through configuring the guiding interface to display the identification information of the display interface which is not displayed in the current display area, the user may be able to quickly navigate to the display interface which is not displayed in the current display area without adjusting the orientation of the terminal. Thus, the user experience may be improved.

In addition to displaying the guidance interface, the terminal may also display a position prompting interface for prompting the spatial location information of the first display interface.

Figure 4:
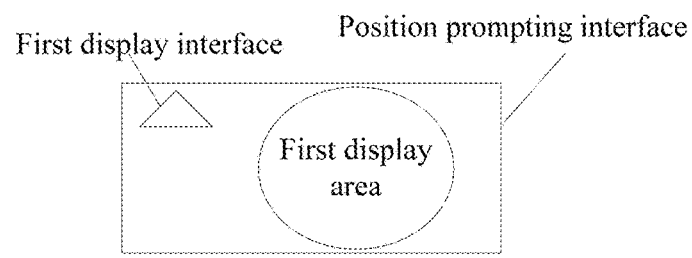
FIG. 4 illustrates an exemplary position prompting interface consistent with disclosed embodiments.

FIG. 4 illustrates an exemplary position prompting interface consistent with disclosed embodiments. The position prompting interface may include the relative position of the first display interface and the first display area, in which the first display interface is a display interface disposed outside the current display area and the first display area is the current display area. The first display interface and the first display area may be distinguished by various features according to various application scenarios.

In one embodiment, as shown in FIG. 4, at the position prompting interface, the first display interface and the first display area may be distinguished by shapes. For example, a circle represents the first display area, a triangle represents the first display interface, and the position prompting interface illustrates the relative position of the first display interface and the first display area. In another embodiment, at the position prompting interface, the first display interface and the first display area may be distinguished by colors.

Figure 5:
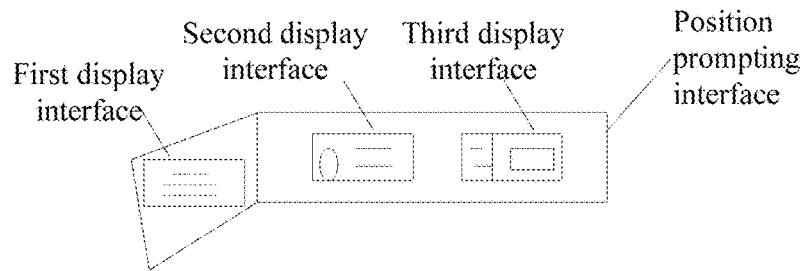
FIG. 5 illustrates another exemplary position prompting interface consistent with disclosed embodiments.

In another embodiment, at the position prompting interface, the first display area may be denoted by a display interface located in the first display area. FIG. 5 illustrates another exemplary position prompting interface consistent with disclosed embodiments. As shown in FIG. 5, the first display area includes a second display interface and a third display interface, and the position prompting interface may include the thumbnails of the first display interface, second display interface, and third display interface. The relative position of the thumbnails of the first display interface, second display interface, and third display interface may coincide with the relative position of the first display interface, second display interface and third display interface in space.

The position prompting interface shown in FIG. 4 or FIG. 5 and the guiding interface shown in FIG. 3 may be triggered simultaneously by the first operation instruction satisfying the preset condition, or may be triggered by other operation instructions different from the first operation instruction. In one embodiment, other operation instructions may be received by the terminal after the terminal receives the first operation instruction and displays the guiding interface, i.e., the terminal may first display the guiding interface, then display the position prompting interface. In another embodiment, other operation instructions may be received by the terminal before the terminal receives the first operation instruction, i.e., the terminal may display the position prompting interface first, then display the guiding interface.

Through displaying the position prompting interface, the user may not only quickly navigate to the display interface located outside the current display area, but also be aware of the position relationship between the current display area and the display interface located outside the current display area, thereby prompting the user the correct movement direction of the terminal to observe the display interface located outside the current display area.

In addition to displaying the guiding interface, the terminal may also display corresponding content according to the user operation on the guiding interface, such that the user may be able to view the display interface located outside the current display area.

Figure 6:
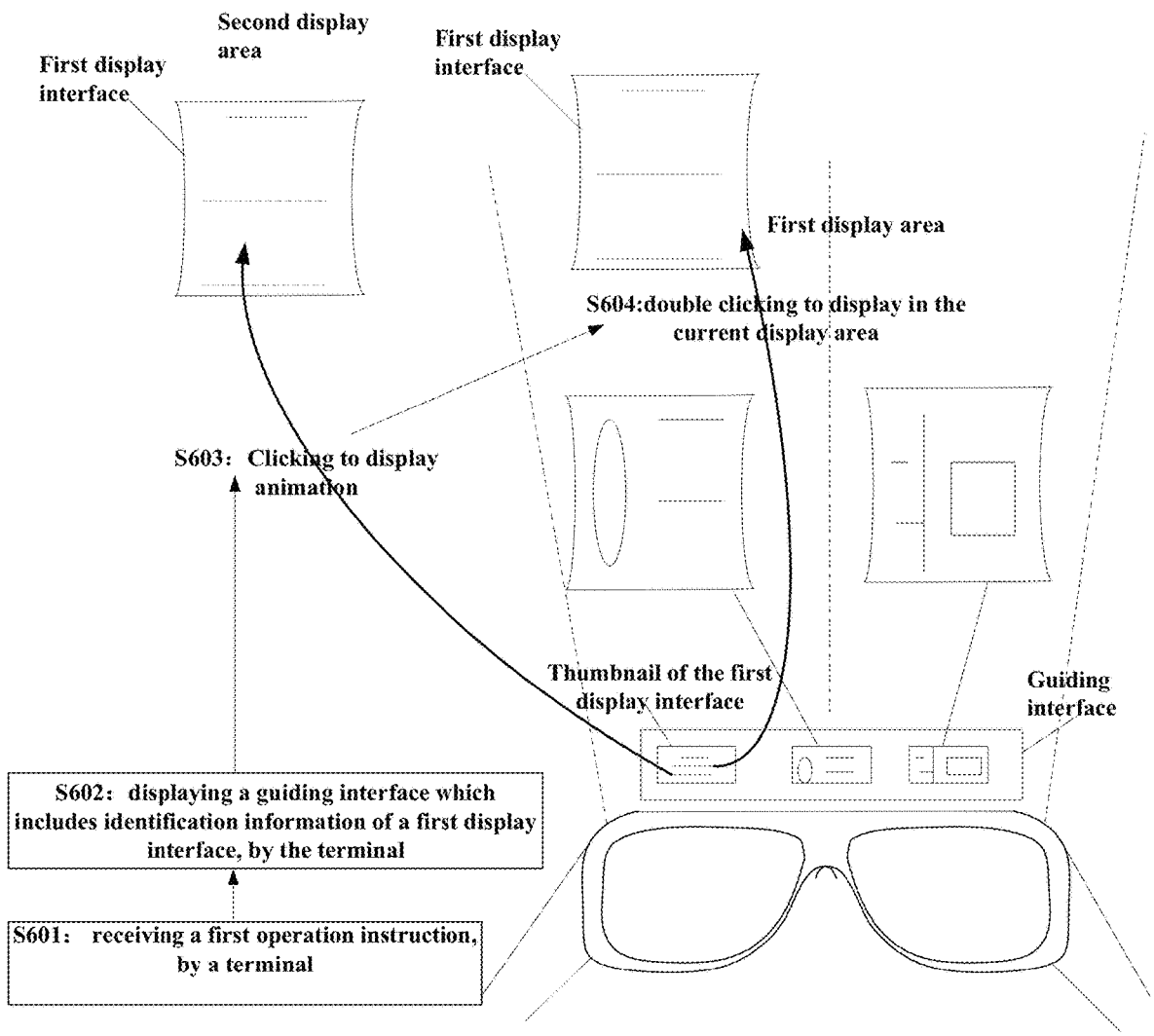
FIG. 6 illustrates a schematic diagram of another exemplary display method consistent with disclosed embodiments.

FIG. 6 illustrates a schematic diagram of another exemplary display method consistent with disclosed embodiments. As shown in FIG. 6, at the beginning, the terminal receives a first operation instruction (S601). In particular, the terminal may receive the first operation instruction from a user positioned at a first orientation with respect to a first display area of the terminal. In response to receiving the first operation instruction, provided that the first operation instruction satisfies a preset condition, the terminal displays a guiding interface which includes identification information of a first display interface (S602).

According to a second operation instruction for the identification information, the terminal displays the display effect of moving the identification information to a target position from the guiding interface (S603). In particular, the target position may be determined based on the display position of the first display interface in space. In one embodiment, the target position may be a position within a preset range from the display position of the first display interface in space. For example, the target position may be the center of the display position of the first display interface in space.

In one embodiment, as shown in FIG. 6, the second operation instruction may be an instruction that is triggered by clicking the guiding interface.

For example, referring to FIG. 3, in response to receiving the instruction trigged by clicking the thumbnail of the first display interface on the guiding interface by the user, the terminal may display the animation where the thumbnail of the first display interface is moving from the guiding interface to the center of the display position of the first display interface in space. That is, the user may be able to see the animation where the thumbnail of the first display interface moves from a position on the guiding interface to the upper left of the current display area. Based on the guiding of the animation, the user may move the terminal to the upper left of the current display area to see the first display interface.

Returning to FIG. 6, after the terminal displays the display effect of moving the identification information to the target position from the guiding interface, the terminal displays the first display interface in the first display area according to a third operation instruction for the identification information (S604).

In one embodiment, as shown in FIG. 6, the third operation instruction may be an instruction that is triggered by double clicking the guiding interface.

For example, referring to FIG. 3, in response to receiving an instruction which is trigged by double clicking the thumbnail of the first display interface on the guiding interface by the user, the terminal may display the first display interface in the current display area. That is, the user may move the first display interface to the current display area display through operating the identification information, such that the user may quickly navigate to the display interface which is not located in the current display area.

Based on the display method shown in FIG. 6, the terminal may display the corresponding effect according to the user operation on the identification information of the display interface at the guiding interface, such that the user may quickly navigate to the display interface which is not located in the current display area.

The terminal shown in FIG. 1 may be used alone or in conjunction with other electronic devices.

Figure 7:
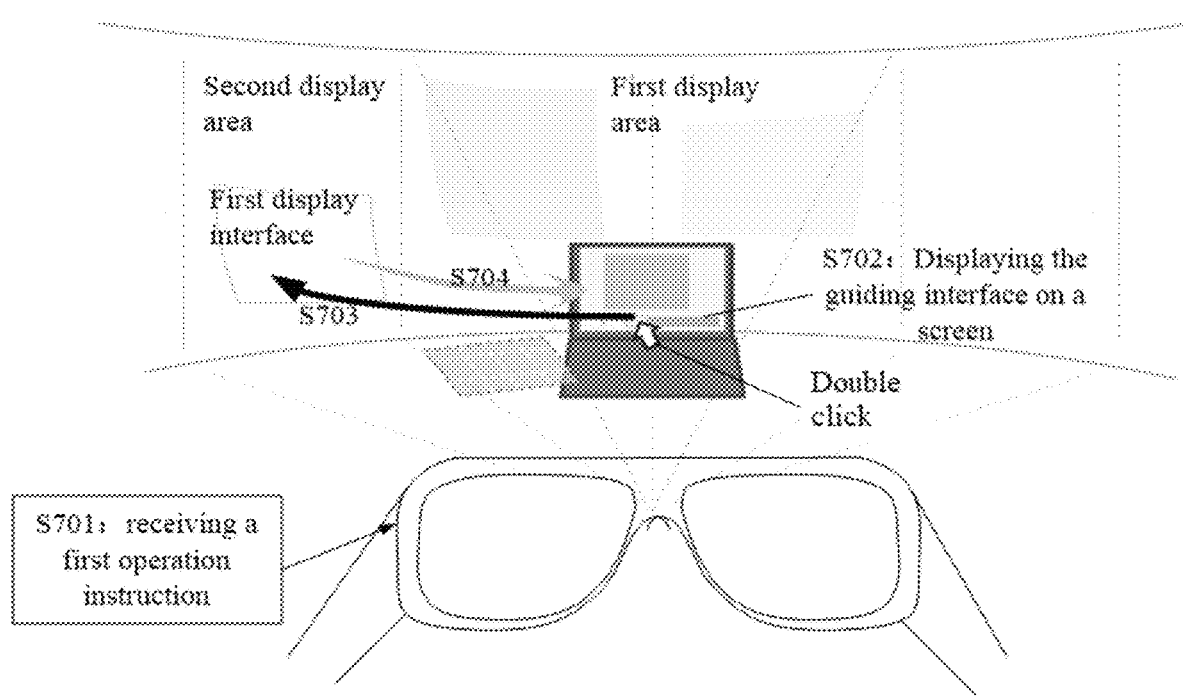
FIG. 7 illustrates a schematic diagram of another exemplary display method consistent with disclosed embodiments.

FIG. 7 illustrates a schematic diagram of another exemplary display method consistent with disclosed embodiments. As shown in FIG. 7, the terminal may be connected to a first device which has a display screen for displaying images. Application may be running on the first device, and the display interface of the applications may be displayed by the terminal. In FIG. 7, the first device is a notebook, which is for illustrative purposes and is not intended to limit the scope of the present disclosure. The first device may also include a mobile phone, a computer, a television, a tablet, and a smart wearable device, etc.

Referring to FIG. 1, the first display area may be a display area in which the terminal (i.e., the user wearing the terminal) is positioned at the first orientation, and the second display area may be a display area in which the terminal is (i.e., the user wearing the terminal) is positioned at the second orientation. Referring to FIG. 7, the first display area of the terminal may include the display screen of the first device. That is, when the terminal is (i.e., the user wearing the terminal) is positioned at the first orientation, the user may be able to see the display screen of the first device, in which the display screen of the first device may be a part of the display area of the terminal and may display the display interface of the terminal. In other words, the first display area of the terminal may include the display screen of the first device and the virtual display screens located around the display screen of the first device. The display interface located in the first display area may be displayed on the display screen of the first device and the virtual display screen, respectively.

The second display area of the terminal may not include the display screen of the first device. That is, when the terminal is disposed at the second orientation, the user may be unable to see the display screen of the first device, because the second display area may only include the virtual display screens. That is, when the terminal (i.e., the user wearing the terminal) moves from the first orientation to the second orientation, the display interface observed by the user may be changed. In other words, after the terminal (i.e., the user wearing the terminal) moves from the first orientation to the second orientation, the user may be able to see the first display interface.

Based on the scene shown in FIG. 7, the present disclosure provides another exemplary display method which may comprise the following steps.

S701: the terminal receives a first operation instruction from a user positioned at a first orientation with respect to a first display area of the terminal.

S702: provided that the first operation instruction satisfies a preset condition, the terminal displays a guiding interface on the display screen of the first device, wherein the guiding interface includes identification information of a first display interface.

The guiding interface displayed on the display screen of the first device may allow the user to operate the guiding interface through the first device.

S703: according to a second operation instruction for the identification information, the terminal displays the display effect of moving the identification information to a target position from the guiding interface, wherein the second operation instruction is determined based on the user operation on the display screen of the first device.

S704: according to a third operation instruction for the identification information, the terminal displays the first display interface on the display screen of the first device.

The first display interface displayed on the display screen of the first device may allow the user to operate the first display interface through the first device. For example, the first display interface may be a text editing interface, such that the first display interface displayed on the display screen of the first device may allow the user to edit the test through the first device, which may be more convenient as compared to the gesture operation.

In addition to the various steps in FIG. 7, when the terminal displays the position prompting interface, similar to the guiding interface, the terminal may also display the position prompting interface on the display screen of the first device, allowing the user to operate the position prompting interface through the first device As shown in FIG. 7, provided that the display area of the terminal includes a real display screen, the user may move an interface (including but not limited to a display interface, a guiding interface and a position prompting interface) to the real display screen, facilitating the editing or the operation of the interface by the user.

Figure 8:
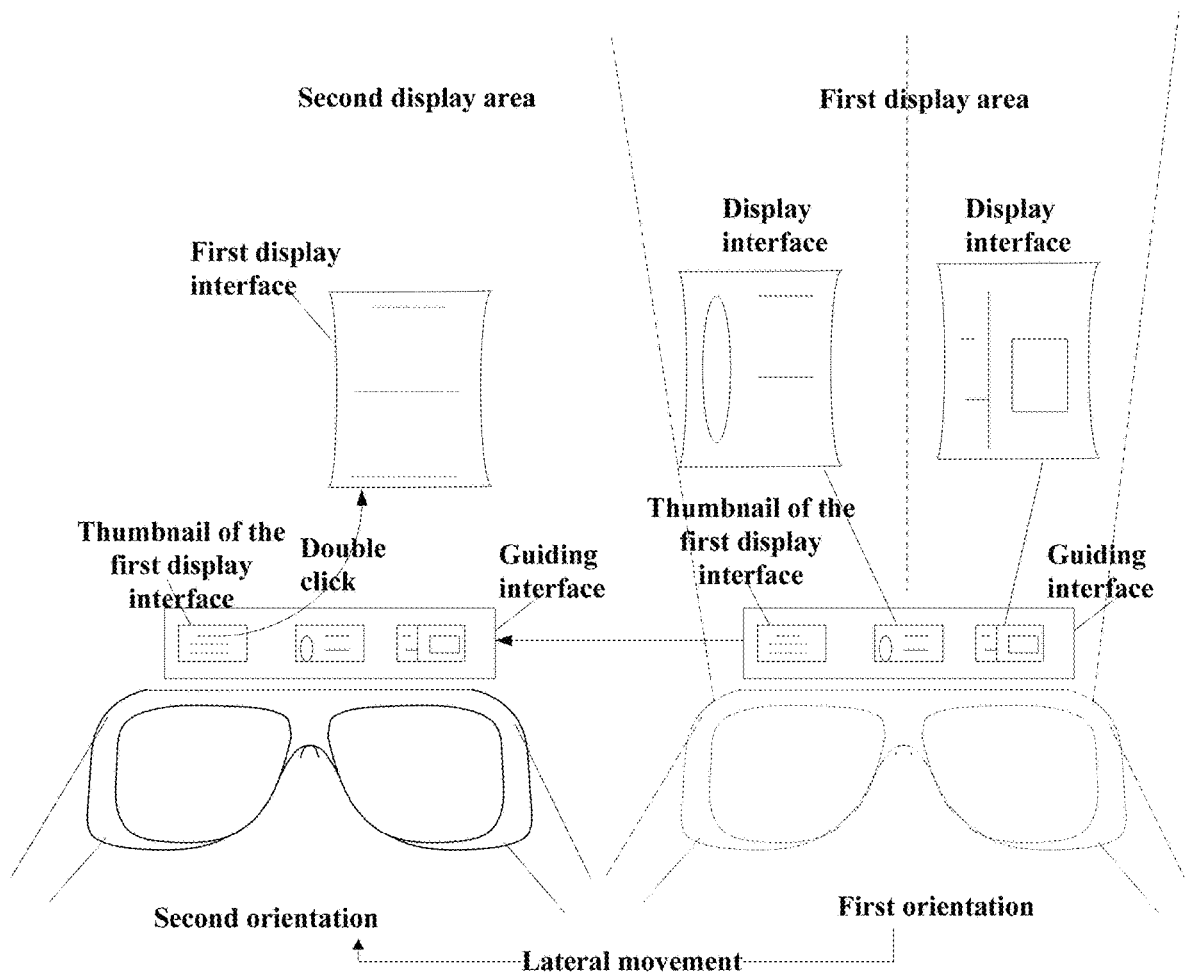
FIG. 8 illustrates a display effect of moving an exemplary terminal to a second orientation from a first orientation consistent with disclosed embodiments.
Figure 10:
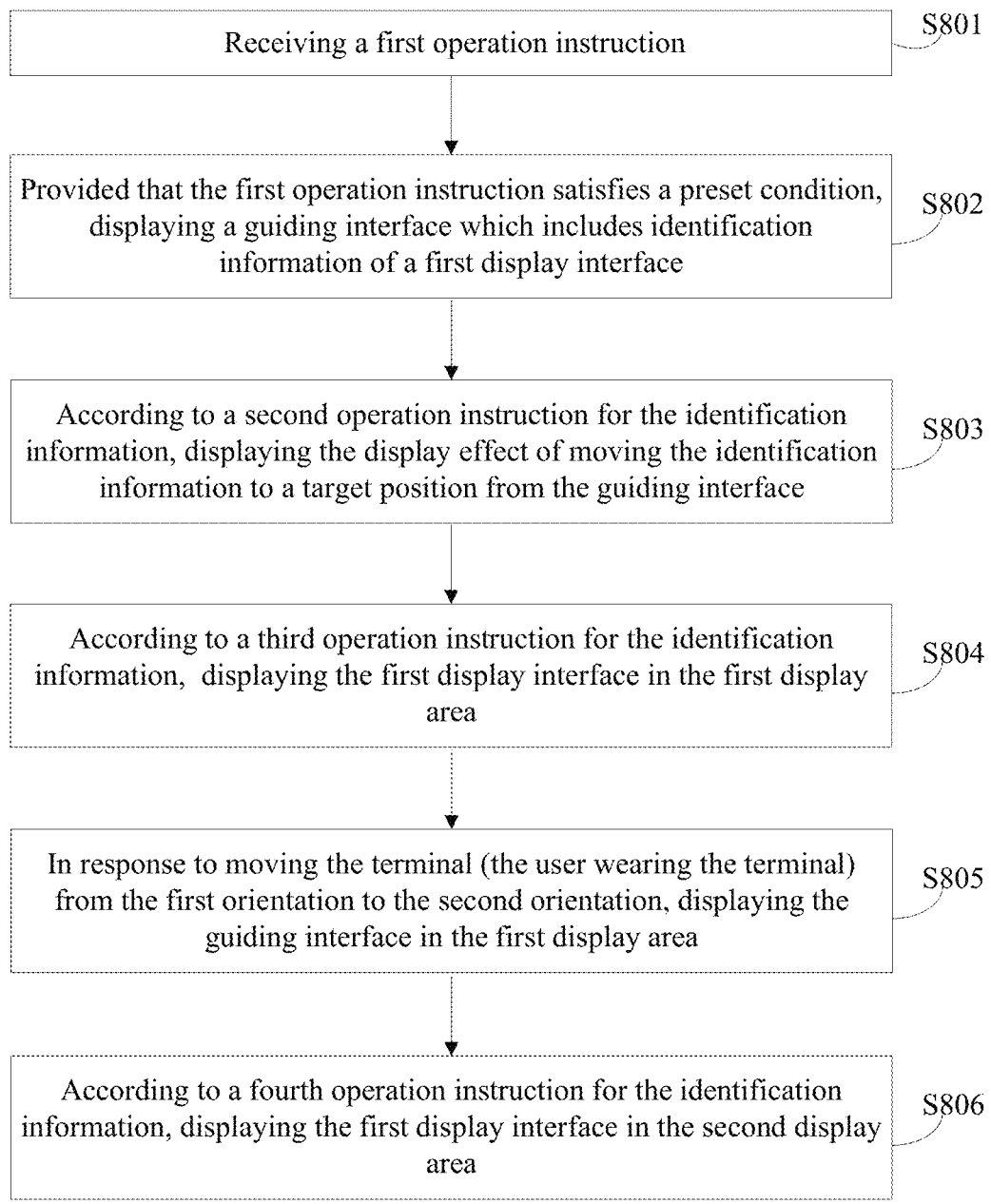
FIG. 10 illustrates a flow chart of another exemplary display method for an exemplary terminal in FIG. 8 consistent with disclosed embodiments.

FIG. 8 illustrates a display effect of moving an exemplary terminal to a second orientation away from a first orientation consistent with disclosed embodiments. FIG. 10 illustrates a flow chart of another exemplary display method for an exemplary terminal in FIG. 8 consistent with disclosed embodiments.

As shown in FIG. 8, although the display position of the first display interface is located in the second display area, the first display interface may be not displayed in the foreground but running in the background.

Referring to FIG. 8 and FIG. 10, the display method may comprise the following steps.

S801: the terminal receives a first operation instruction from a user positioned at a first orientation with respect to a first display area of the terminal.

S802: provided that the first operation instruction satisfies a preset condition, the terminal displays a guiding interface including identification information of a first display interface.

S803: according to a second operation instruction for the identification information, the terminal displays the display effect of moving the identification information to a target position from the guiding interface.

S804: according to a third operation instruction for the identification information, the terminal displays the first display interface in the first display area.

S805: in response to moving the terminal (i.e., the user wearing the terminal) from the first orientation to the second orientation, the terminal displays the guiding interface in the first display area.

S806: according to a fourth operation instruction for the identification information, the terminal displays the first display interface in the second display area.

In particular, the fourth operation instruction may be the same as or may be different from the third operation instruction. For example, provided that the terminal receives an instruction which is trigged by double clicking the thumbnail of the first display interface on the guiding interface in the second display area by the user, the terminal may display the first display interface in the second display area.

As shown in FIG. 8, the guiding interface may be displayed in the current display area by following the movement of the terminal. That is, when the terminal (i.e., the user wearing the terminal) moves from the first orientation to the second orientation and the current display area is changed from the first display area to the second display area, the guiding interface may follow the movement of the terminal to be displayed in the second display area.

It should be noted that, because the guiding interface includes the identification information of the interface which is not displayed in the current display area, even the user cannot see the display interface in the current display area (i.e., the first display area), the user may still be able to quickly navigate to the display interfaces in the first display area through the guiding interface.

Figure 9:
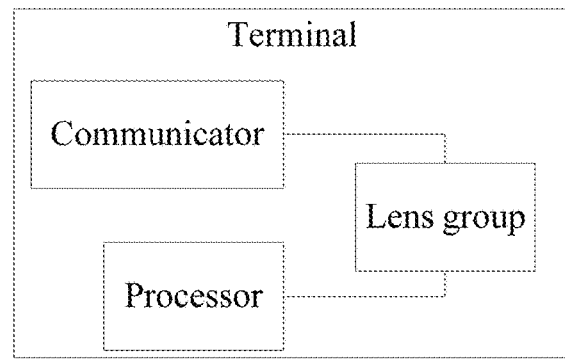
FIG. 9 illustrates a block diagram of an exemplary terminal consistent with disclosed embodiments.

FIG. 9 illustrates a block diagram of an exemplary terminal consistent with disclosed embodiments. As shown in FIG. 9, the terminal may comprise a communicator and a processor. In certain embodiments, the terminal may further comprise a lens group.

The lens group may include at least one lens. In particular, the lens group may project the content of a virtual image to the user's eyes, thereby presenting the display content. The communicator may receive the first operation instruction.

In one embodiment, provided that the first operation instruction satisfies a preset condition, the processor may control the lens group to display a guiding interface including identification information of a first display interface.

In another embodiment, according to a second operation instruction for the identification information, the processor may further control the lens group to display the display effect of moving the identification information to a target position from the guiding interface. The target position may be determined according to a display position of the first display interface in space.

In another embodiment, according to a third operation instruction for the identification information, the processor may further display the first display interface in the first display area.

In another embodiment, the terminal may be connected to a first device having a display screen for displaying images, and the processor may further control the lens group to display the guiding interface on the display screen of the first device.

In another embodiment, the terminal (i.e., the user wearing the terminal) may move from the first orientation to the second orientation, and the processor may further display the guiding interface in the second display area with respect to the second orientation, and display the first display interface in the second display area according to a fourth operation instruction for the identification information.

The implementation process of the functions of the processor and examples described in the disclosed embodiment may be referred to the detail decryption of the disclosed display methods, which will not be repeated here.

The terminal shown in FIG. 9 may configure the guiding interface to display the identification information of the display interfaces which are not displayed in the current display area, such that the user may be able to quickly navigate to the display interface which is displayed outside the current FOV without moving the terminal. Thus, the user experience may be improved. In addition, the terminal may display the corresponding effect according to the user operation on the identification information of the display interface on the guiding interface, thereby facilitating the user's viewing of the interface which is displayed outside the current display area. Further, the guiding interface displayed by the terminal shown in FIG. 9 may also be moved along with the display area of the terminal, such that the guiding interface may be always displayed in the current display area of the terminal, thereby facilitating the user's viewing of the interface which is displayed outside the current display area.

The terminal shown in FIG. 9 may include, but is not limited to, AR or VR glasses.

When the functions of the disclosed display methods are implemented in the form of a software functional unit and sold or used as an independent product, the functions of the disclosed display methods may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a universal serial bus (USB) flash drive, a removable hard disk, a read-only memory (ROM), a random access memory (RAM), a magnetic disk, or an optical disc.

Various embodiments of the present specification are described in a progressive manner, in which each embodiment focusing on aspects different from other embodiments, and the same and similar parts of each embodiment may be referred to each other.

In the present disclosure, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The present disclosure provides a display method and a terminal. In response to receiving the first operation instruction satisfies a preset condition, the terminal may display a guiding interface, which includes identification information of the first display interface located outside a current display area. Thus, even the first display interface is not displayed in the current display area, the user may still be able to acquire the identification information of the first display interface through the guiding interface, thereby quickly navigating to the first display interface.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A display method, comprising:
   receiving a first operation instruction by a terminal from a user positioned at a first orientation with respect to a first display area of the terminal; and
   responsive to receiving the first operation instruction, displaying, by the terminal, a guiding interface at least including identification information of a first display interface disposed outside the first display area of the terminal;
   displaying, by the terminal, a position prompting interface for prompting spatial location information of the first display interface;
   wherein:

one or more second display interfaces and the guiding interface are displayed in the first display area of the terminal;

the position prompting interface displays a first icon associated with the first display interface at a first icon position and one or more second icons associated with the one or more second display interfaces at one or more second icon positions, the first icon position and the one or more second icon positions indicating relative spatial positions of the first display area and the one or more second display interfaces; and an operation on the guiding interface triggers a response with respect to the first display interface.

2. The display method according to claim 1, further including:

in response to changing the first orientation of the user to a second orientation, obtaining a second display area of the terminal with respect to the second orientation, the second display area being different from the first display area.

3. The display method according to claim 1, further including:

according to a second operation instruction, displaying, by the terminal, a display effect of moving the identification information of the first display interface to a target position away from the guiding interface.

4. The display method according to claim 3, further including:

according to a third operation instruction, displaying, by the terminal, the first display interface in the first display area.

5. The display method according to claim 1, wherein:

the terminal is connected to a first device including a display screen, and the display method further includes:

displaying, by the terminal, the guiding interface on the display screen of the first device.

6. The display method according to claim 1, wherein:

the terminal is connected to a first device including a display screen, and the display method further includes:

displaying, by the terminal, the guiding interface on the display screen of the first device.

7. The display method according to claim 2, wherein in response to changing the first orientation of the user to the second orientation with respect to the second display area, the display method further includes:

displaying, by the terminal, the guiding interface in the second display area.

8. The display method according to claim 7, wherein in response to displaying, by the terminal, the guiding interface in the second display area with respect to the second orientation, the display method further includes:

according to a fourth operation instruction, displaying, by the terminal, the first display interface in the second display area.

9. A terminal, comprising:

a processor;

a display device coupled to the processor; and an input device, wherein the input device is coupled to the processor and receives a first operation instruction from a user positioned at a first orientation with respect to a first display area of the display device, wherein:

responsive to the input device receiving the first operation instruction, the processor controls the display device to display a guiding interface including identification information of a first display interface disposed at least partially outside the first display area of the display device;

one or more second display interfaces and the guiding interface are displayed in the first display area of the terminal;

a position prompting interface for prompting spatial location information of the first display interface is displayed in the first display area, the position prompting interface displaying a first icon associated with the first display interface at a first icon position and one or more second icons associated with the one or more second display interfaces at one or more second icon positions, the first icon position and the one or more second icon positions indicating relative spatial positions of the first display area and the one or more second display interfaces; and an operation on the guiding interface triggers a response with respect to the first display interface.

10. The terminal according to claim 9, wherein the processor:

in response to the first orientation of the user being changed to a second orientation, obtains a second display area of the display device with respect to the second orientation.

11. The terminal according to claim 9, wherein the processor:

according to a second operation instruction, controls the display device to display a display effect of moving the identification information of the first display interface to a target position away from the guiding interface.

12. The terminal according to claim 9, wherein the processor:

according to a third operation instruction, controls the display device to display the first display interface in the first display area.

13. The terminal according to claim 9, wherein:

the terminal is connected to a first device including a display screen; and the processor controls a lens group to display the guiding interface on the display screen of the first device.

14. The terminal according to claim 9, wherein:

the terminal is connected to a first device including a display screen; and the processor controls a lens group to display the guiding interface on the display screen of the first device.

15. The terminal according to claim 10, wherein after the first orientation of the user is changed to the second orientation with respect to the second display area of the display device, the processor:

displays the guiding interface in the second display area with respect to the second orientation; and according to a fourth operation instruction for the identification information, displays the first display interface in the second display area.

16. The terminal according to claim 15, wherein in response to displaying the guiding interface in the second display area with respect to the second orientation, the processor:

according to a fourth operation instruction for the identification information, displays the first display interface in the second display area.

* * * * *